United States Patent
Yochai et al.

(10) Patent No.: US 8,838,889 B2
(45) Date of Patent: Sep. 16, 2014

(54) METHOD OF ALLOCATING RAID GROUP MEMBERS IN A MASS STORAGE SYSTEM

(75) Inventors: Yechiel Yochai, Moshav Aviel (IL); Leo Corry, Ramat Gan (IL); Haim Kopylovitz, Herzliya (IL)

(73) Assignee: Infinidat Ltd., Herzliya (IL)

( * ) Notice: Subject to any disclaimer, the term of this patent is extended or adjusted under 35 U.S.C. 154(b) by 755 days.

(21) Appl. No.: 13/008,946

(22) Filed: Jan. 19, 2011

(65) Prior Publication Data

US 2011/0202723 A1    Aug. 18, 2011

Related U.S. Application Data

(60) Provisional application No. 61/296,326, filed on Jan. 19, 2010.

(51) Int. Cl.
| | |
|---|---|
| *G06F 12/06* | (2006.01) |
| *G06F 3/06* | (2006.01) |
| *G06F 11/10* | (2006.01) |

(52) U.S. Cl.
CPC ............ *G06F 3/0614* (2013.01); *G06F 3/0631* (2013.01); *G06F 2206/1012* (2013.01); *G06F 11/1076* (2013.01); *G06F 3/0689* (2013.01); *G06F 2211/1057* (2013.01)
USPC ..... 711/114; 711/170; 711/162; 711/E12.103

(58) Field of Classification Search
CPC ..... G06F 3/061; G06F 3/0614; G06F 3/0631; G06F 3/0689; G06F 11/1076; G06F 2206/1012; G06F 211/1057
See application file for complete search history.

(56) References Cited

U.S. PATENT DOCUMENTS

| | | | |
|---|---|---|---|
| 5,542,064 A | * | 7/1996 | Tanaka et al. ................. 711/114 |
| 2002/0053009 A1 | * | 5/2002 | Selkirk et al. ................. 711/162 |
| 2003/0037214 A1 | * | 2/2003 | Voigt et al. .................... 711/170 |
| 2003/0182494 A1 | * | 9/2003 | Rodrigues et al. ............ 711/100 |
| 2009/0327801 A1 | * | 12/2009 | Maeda et al. ..................... 714/6 |
| 2010/0049919 A1 | | 2/2010 | Winokur et al. |
| 2010/0057990 A1 | * | 3/2010 | Mizuno et al. ................ 711/114 |
| 2010/0251012 A1 | * | 9/2010 | Zwisler et al. ................ 711/114 |
| 2010/0287408 A1 | * | 11/2010 | Kopylovitz ................... 711/114 |

* cited by examiner

*Primary Examiner* — Michael Krofcheck
(74) *Attorney, Agent, or Firm* — Oren Reches

(57) ABSTRACT

There are provides an allocation module and a method of allocating a logical disk to a next member of a given RAID group. The method comprises: identifying one or more physical disks comprising at least one logical disk with already allocated member of said given RAID group, thus giving rise to allocated physical disks; identifying one or more pairs constituted by at least one allocated physical disk with non-allocated physical disks, said pairs having minimal number of RAID groups with members allocated to both physical disks in the pair, thus giving rise to a first group of pairs with minimal contention value; and selecting among the first group of pairs with minimal contention value one or more non-allocated physical disks as candidate physical disks for allocating said next member $MEM_{i+1}$ of said given RAID group, wherein $0<i<N+1$. The method further comprises identifying among one or more disk units corresponding to one or more selected candidate physical disks at least one disk unit matching a reliability criterion; identifying at least one candidate physical disk corresponding to the at least one identified disk unit; and allocating said next member of said given RAID group to a free logical disk in the identified at least one candidate physical disk.

19 Claims, 5 Drawing Sheets

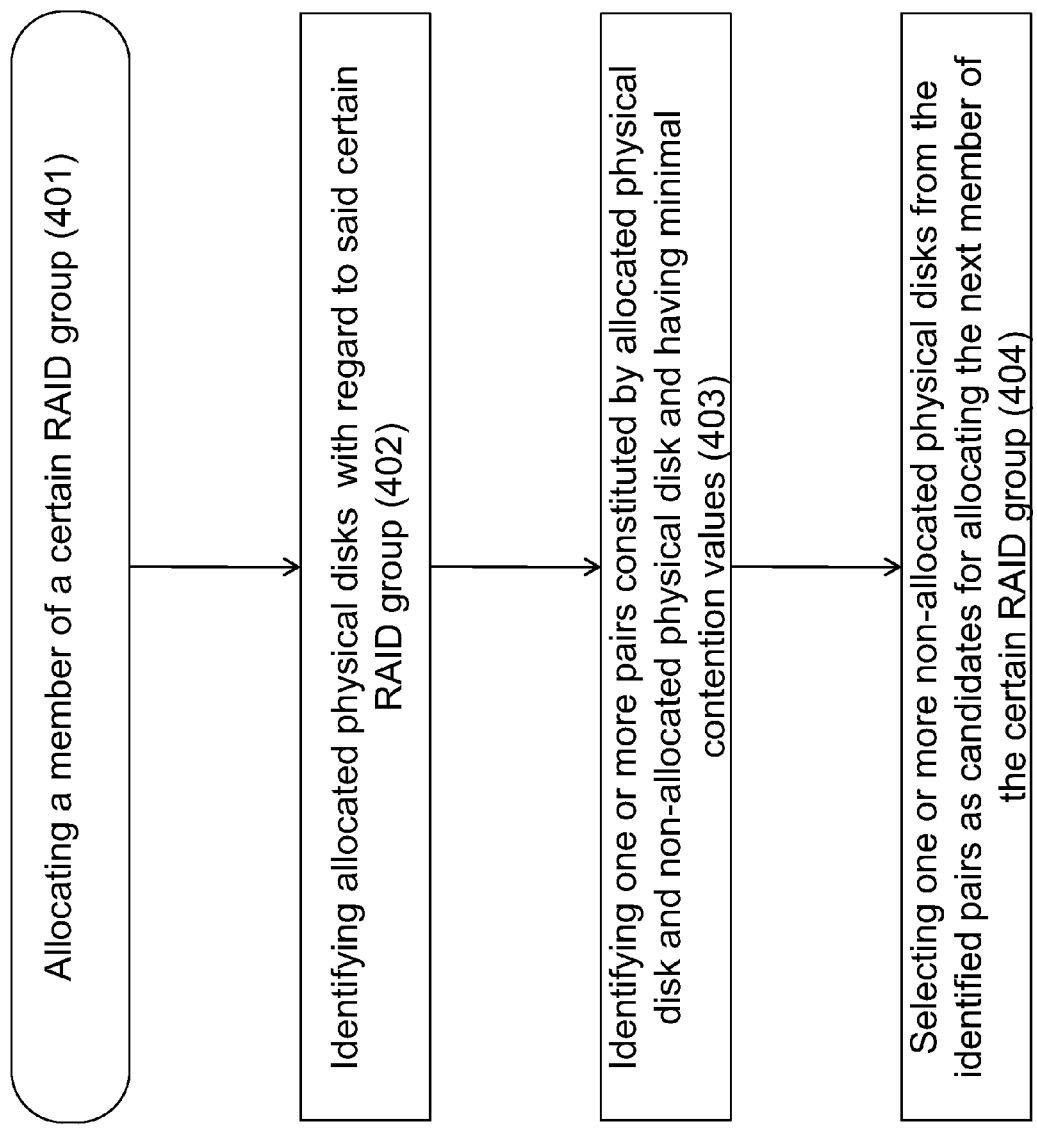

METHOD OF ALLOCATING RAID GROUP MEMBERS IN A MASS STORAGE SYSTEM

CROSS-REFERENCES TO RELATED APPLICATIONS

This application relates to and claims priority from U.S. Provisional Patent Application No. 61/296,326 filed on Jan. 19 2010 and incorporated herein by reference in its entirety.

FIELD OF THE INVENTION

The present invention relates, in general, to data storage systems and respective methods for data storage, and, more particularly, to storage systems with implemented RAID protection and methods of operating thereof.

BACKGROUND OF THE INVENTION

Modern enterprises are investing significant resources to preserve and provide access to data. Data protection is a growing concern for businesses of all sizes. Users are looking for a solution that will help to verify that critical data elements are protected, and storage configuration can enable data integrity and provide a reliable and safe switch to redundant computing resources in case of an unexpected disaster or service disruption.

To accomplish this, storage systems may be designed as fault tolerant systems spreading data redundantly across a set of storage-nodes and enabling continuous operation when a hardware failure occurs. Fault tolerant data storage systems may store data across a plurality of disk drives and may include duplicate data, parity or other information that may be employed to reconstruct data if a drive fails. Data storage formats, such as RAID (Redundant Array of Independent Discs), may be employed to protect data from internal component failures by making copies of data and rebuilding lost or damaged data.

SUMMARY OF THE INVENTION

In accordance with certain aspects of the presently disclosed subject matter, there is provided a method of allocating a logical disk to a next member of a given RAID group in a storage system comprising a plurality of disk units constituting a physical storage space configured as a concatenation of a plurality of RAID groups, each disk unit comprising a plurality of physical disks, each physical disk configured to comprise a plurality of logical disks. The method comprises: identifying one or more physical disks comprising at least one logical disk with already allocated member of said given RAID group, thus giving rise to allocated physical disks; identifying one or more pairs constituted by at least one allocated physical disk with non-allocated physical disks, said pairs having minimal number of RAID groups with members allocated to both physical disks in the pair, thus giving rise to a first group of pairs with minimal contention value; and selecting among the first group of pairs with minimal contention value one or more non-allocated physical disks as candidate physical disks for allocating said next member $MEM_{i+1}$ of said given RAID group having N+2 members, wherein $0 < i < N+1$.

The method can further comprise identifying among one or more disk units corresponding to one or more selected candidate physical disks at least one disk unit matching a reliability criterion; identifying at least one candidate physical disk corresponding to the at least one identified disk unit and allocating said next member of said given RAID group to a free logical disk in the identified at least one candidate physical disk. In case of RAID 6 configuration, the reliability criterion requires that a matching disk unit comprises less than two logical disks allocated to different members of said given RAID group.

In case that none of the disk units corresponding to the selected candidate physical disks matches the reliability criterion, the method can further comprise identifying one or more pairs of non-allocated physical disks with minimal number of RAID groups with members allocated to both physical disks in the pair, thus giving rise to a second group of pairs with minimal contention value, and selecting among the second group of pairs with minimal contention value one or more non-allocated physical disks as candidate physical disks for allocating said next member $MEM_{i+1}$ of said given RAID group. The method can further comprise identifying among the disk units corresponding to the selected candidate physical disks at least one disk unit matching a reliability criterion; identifying at least one candidate physical disk corresponding to the at least one selected disk unit and allocating said next member of said given RAID group to a free logical disk in the identified at least one candidate physical disk.

The first group with minimal contention value can be constituted by all pairs having minimal number of RAID groups with members allocated to both physical disks in the pair, such pairs identified for each allocated physical disk.

The method can further comprise selecting among the first group of pairs with minimal contention value all non-allocated physical disks as candidate physical disks, or selecting among the first group non-allocated disks matching a certain selection criteria.

In accordance with further aspects of the presently disclosed subject matter, in case of RAID 6 configuration, the storage system can be configured so that number of members of a RAID group equals twice the number of disk units in the storage system, and the method, accordingly, can enable allocating in a manner that every disk unit comprises logical disks allocated to members of each RAID group, and wherein there are two logical disks in each disk unit allocated to a certain RAID group. Rebuilding after a second failure can be first provided to the members of RAID groups that are common to respective failed disks.

In accordance with further aspects of the presently disclosed subject matter, the allocation method enables that the percentage of common data shared between two physical disks is characterized by a number of members in a RAID group divided by a number of physical disks in the storage system.

In accordance with further aspects of the currently disclosed subject matter, at least one of the following operations can be provided until a predefined number of matches are made (or other predefined criteria are matched): identifying pairs having minimal number of RAID groups with members allocated to both physical disks in the pair, selecting candidate physical disks, identifying disk units matching the reliability criterion and final selecting corresponding candidate disk for allocation.

In accordance with other aspects of the presently disclosed subject matter, there is provided a method of allocating a logical disk to a next member of a given RAID group in a storage system comprising a plurality of disk units constituting a physical storage space configured as a concatenation of a plurality of RAID groups, each disk unit comprising a plurality of physical disks, each physical disk configured to comprise a plurality of logical disks. The method comprises: a) identifying a pair constituted by a first physical disk with already at least one allocated member of said given RAID group and a second physical disk with no allocated members of said given RAID group, said pair having minimal number of RAID groups with members allocated to both physical disks in the pair, thus giving rise to a first pair with minimal contention value; b) checking if the disk unit corresponding to the second physical disk matches a reliability criterion and, if not, identifying a next first pair with minimal contention value; c) repeating the operation b) until identifying the disk unit matching the reliability criteria; and d) allocating said next member of said given RAID group to a free logical disk in the second physical disk in respective first pair with minimal contention value.

The method can further comprise, in case that upon repeating the operation b) until completing the check for all disk units corresponding to second physical disks in all pairs with minimal contention value, none of respective disk units matches the reliability criterion, e) identifying a pair constituted by physical disks with no allocated members of said given RAID group, said pair having minimal number of RAID groups with members allocated to both physical disks in the pair, thus giving rise to a second pair with minimal contention value; f) checking if the disk unit corresponding to one of the physical disks in the second pair matches a reliability criterion and, if not, identifying a next second pair with minimal contention value; g) repeating the operation e) until identifying the disk unit matching the reliability criteria; and h) allocating said next member of said given RAID group to a free logical disk in the physical disk in respective second pair with minimal contention value.

In accordance with other aspects of the presently disclosed subject matter, there is provided an allocation module operable to allocate a logical disk to a next member of a given RAID group, this allocation module configured for use in a storage system comprising a plurality of disk units constituting a physical storage space configured as a concatenation of a plurality of RAID groups, each disk unit comprising a plurality of physical disks, each physical disk configured to comprise a plurality of logical disks. The allocation module is operable: to identify one or more physical disks comprising at least one logical disk with already allocated member of said given RAID group, thus giving rise to allocated physical disks; to identify one or more pairs constituted by at least one allocated physical disk with non-allocated physical disks, said pairs having minimal number of RAID groups with members allocated to both physical disks in the pair, thus giving rise to a first group of pairs with minimal contention value; and to select among the first group of pairs with minimal contention value one or more non-allocated physical disks as candidate physical disks for allocating said next member $MEM_{i+1}$ of said given RAID group having N+2 members, wherein $0 < i < N+1$.

The allocation module can be further operable to identify among one or more disk units corresponding to one or more selected candidate physical disks at least one disk unit matching a reliability criterion; to identify at least one candidate physical disk corresponding to the at least one identified disk unit and to allocate said next member of said given RAID group to a free logical disk in the identified at least one candidate physical disk. In case of RAID 6 configuration, the reliability criterion requires that a matching disk unit comprises less than two logical disks allocated to different members of said given RAID group.

In case that the first group with minimal contention value is constituted by all pairs having minimal number of RAID groups with members allocated to both physical disks in the pair, such pairs identified for each allocated physical disk, the allocation module can be further operable to select among the first group of pairs with minimal contention value all non-allocated physical disks as candidate physical disks, or to select among the first group non-allocated disks matching a certain selection criteria.

The allocation module can be further operable, in case that none of disk units corresponding to the selected candidate physical disks matches the reliability criterion, to identify one or more pairs of non-allocated physical disks with minimal number of RAID groups with members allocated to both physical disks in the pair, thus giving rise to a second group of pairs with minimal contention value, and to select among the second group of pairs with minimal contention value one or more non-allocated physical disks as candidate physical disks for allocating said next member $MEM_{i+1}$ of said given RAID group.

The allocation module can be further operable to identify among the disk units corresponding to the selected candidate physical disks at least one disk unit matching a reliability criterion; to identify at least one candidate physical disk corresponding to the at least one selected disk unit, and to allocate said next member of said given RAID group to a free logical disk in the identified at least one candidate physical disk.

In accordance with further aspects of the presently disclosed subject matter, the allocation module can be operable to provide at least one of the following operations until a predefined number of matches are made (or other predefined criteria are matched): identifying pairs having minimal number of RAID groups with members allocated to both physical disks in the pair, selecting candidate physical disks, identifying disk units matching the reliability criterion, and final selecting corresponding candidate disk for allocation.

In accordance with other aspects of the presently disclosed subject matter, there is provided a storage system comprising the disclosed allocation module operatively connected to the plurality of disk units and/or operating in accordance with the disclosed method.

Among advantages of certain embodiments of the present invention is enhancing the efficiency of the distribution of data over physical resources in the storage system. The provided method of allocating RAID groups members to the logical disks enables reduced danger of data loss due to component failure whilst accounting for load balancing requirements.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 4a and 4b illustrate a generalized flow-chart of allocating a logical disk for a next member of a certain RAID group in accordance with certain embodiments of the presently disclosed subject matter.

DETAILED DESCRIPTION OF EMBODIMENTS

Figure 1:
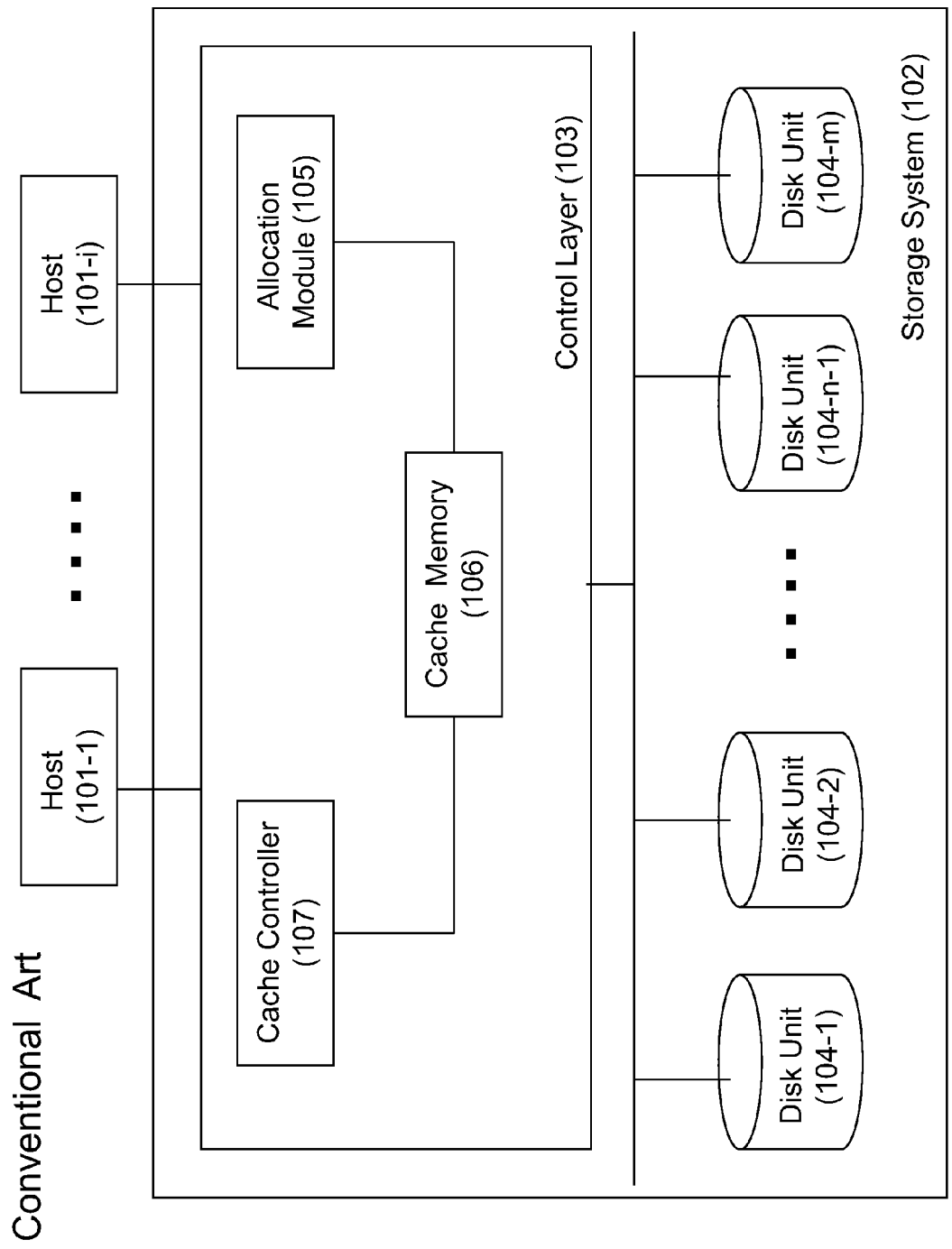
FIG. 1 illustrates a generalized functional block diagram of a mass storage system where the presently disclosed subject matter can be implemented.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "selecting", "identifying", "configuring", "allocating", "storing", "managing" or the like, refer to the action and/or processes of a computer that manipulate and/or transform data into other data, said data represented as physical, such as electronic, quantities and/or said data representing the physical objects. The term "computer" should be expansively construed to cover any kind of electronic system with data processing capabilities, including, by way of non-limiting example, storage system and parts thereof disclosed in the present applications.

The operations in accordance with the teachings herein may be performed by a computer specially constructed for the desired purposes or by a general-purpose computer specially configured for the desired purpose by a computer program stored in a computer readable storage medium.

Embodiments of the present invention are not described with reference to any particular programming language. It will be appreciated that a variety of programming languages may be used to implement the teachings of the inventions as described herein.

The references cited in the background teach many principles of operating a storage system that are applicable to the present invention. Therefore the full contents of these publications are incorporated by reference herein where appropriate for appropriate teachings of additional or alternative details, features and/or technical background.

In the drawings and descriptions, identical reference numerals indicate those components that are common to different embodiments or configurations.

Bearing this in mind, attention is drawn to FIG. 1 illustrating an exemplary storage system as known in the art.

The plurality of host computers (workstations, application servers, etc.) illustrated as 101-1-101-n share common storage means provided by a storage system 102. The storage system comprises a storage control layer 103 comprising one or more appropriate storage control devices operatively coupled to the plurality of host computers and a plurality of data storage devices 104-1-104-m constituting a physical storage space optionally distributed over one or more storage nodes, wherein the storage control layer is operable to control interface operations (including I/O operations) therebetween. The storage control layer is further operable to handle a virtual representation of physical storage space and to facilitate necessary mapping between the physical storage space and its virtual representation. The virtualization functions may be provided in hardware, software, firmware or any suitable combination thereof. Optionally, the functions of the control layer may be fully or partly integrated with one or more host computers and/or storage devices and/or with one or more communication devices enabling communication between the hosts and the storage devices. Optionally, a format of logical representation provided by the control layer may differ depending on interfacing applications.

The physical storage space may comprise any appropriate permanent storage medium and include, by way of non-limiting example, one or more disk drives and/or one or more disk units (DUs), comprising several disks. The storage control layer and the storage devices may communicate with the host computers and within the storage system in accordance with any appropriate storage protocol.

Stored data may be logically represented to a client in terms of logical objects. Depending on storage protocol, the logical objects may be logical volumes, data files, image files, etc. For purpose of illustration only, the following description is provided with respect to logical objects represented by logical volumes. Those skilled in the art will readily appreciate that the teachings of the present invention are applicable in a similar manner to other logical objects.

A logical volume or logical unit (LU) is a virtual entity logically presented to a client as a single virtual storage device. The logical volume represents a plurality of data blocks characterized by successive Logical Block Addresses (LBA) ranging from 0 to a number LUK. Different LUs may comprise different numbers of data blocks, while the data blocks are typically of equal size (e.g. 512 bytes). Blocks with successive LBAs may be grouped into portions that act as basic units for data handling and organization within the system. Thus, for instance, whenever space has to be allocated on a disk or on a memory component in order to store data, this allocation may be done in terms of data portions also referred to hereinafter as "allocation units". Data portions are typically of equal size throughout the system (by way of non-limiting example, the size of a data portion may be 64 Kbytes).

The storage control layer may be further configured to facilitate various protection schemes. By way of non-limiting example, data storage formats, such as RAID (Redundant Array of Independent Discs), may be employed to protect data from internal component failures by making copies of data and rebuilding lost or damaged data. As the likelihood for two concurrent failures increases with the growth of disk array sizes and increasing disk densities, data protection may be implemented, by way of non-limiting example, with the RAID 6 data protection scheme well known in the art.

Common to all RAID 6 protection schemes is the use of two parity data portions per several data groups (e.g. using groups of four data portions plus two parity portions in (4+2) protection scheme), the two parities being typically calculated by two different methods. Under one known approach, all n consecutive data portions are gathered to form a RAID group, to which two parity portions are associated. The members of a group as well as their parity portions are typically stored in separate drives. Under a second known approach, protection groups may be arranged as two-dimensional arrays, typically n*n, such that data portions in a given line or column of the array are stored in separate disk drives. In addition, to every row and to every column of the array a parity data portion may be associated. These parity portions are stored in such a way that the parity portion associated with a given column or row in the array resides in a such disk drive where no other data portion of the same column or row also resides. Under both approaches, whenever data is written to a data portion in a group, the parity portions are also updated (e.g. using techniques based on XOR or Reed-Solomon algorithms). Whenever a data portion in a group becomes unavailable (e.g. because of disk drive general malfunction, or because of a local problem affecting the portion alone, or because of other reasons), the data can still be recovered with the help of one parity portion via appropriate known in the art techniques. Then, if a second malfunction causes data unavailability in the same drive before the first problem was repaired, data can nevertheless be recovered using the second parity portion and appropriate known in the art techniques.

The storage control layer can further comprise an Allocation Module 105, a Cache Memory 106 operable as part of the IO flow in the system, and a Cache Control Module 107, that regulates data activity in the cache.

The allocation module, the cache memory and the cache control module may be implemented as centralized modules operatively connected to the plurality of storage control devices or may be distributed over a part or all storage control devices.

Successive data portions constituting a logical volume are typically stored in different disk drives (e.g. for purposes of both performance and data protection), and to the extent that it is possible, across different DUs. Definition of LUs in the storage system involves configuring an allocation scheme used to determine the location of the various data portions and their associated parity portions across the physical storage medium. Logical contiguity of successive portions and physical contiguity of the storage location allocated to the portions in the system are not necessarily correlated. The allocation scheme may be handled in an allocation module (105) being a part of the storage control layer. The allocation module may be implemented as a centralized module operatively connected to the plurality of storage control devices or may be distributed over a part or all storage control devices.

When receiving a write request from a host, the storage control layer defines a physical location(s) designated for writing the respective data in accordance with an allocation scheme and, optionally, preconfigured rules and policies stored in the allocation module or otherwise. When receiving a read request from the host, the storage control layer defines the physical location(s) of the desired data and further processes the request accordingly. Similarly, the storage control layer issues updates to a given data object to all storage nodes that physically store data related to said data object. The storage control layer is further operable to redirect the request/update to storage device(s) with appropriate storage location(s) irrespective of the specific storage control device receiving I/O request.

For purpose of illustration only, the operation of the storage system is described herein in terms of entire data portions. Those skilled in the art will readily appreciate that the teachings of the present invention are applicable in a similar manner to partial data portions.

Certain embodiments of the present invention are applicable to the architecture of a computer system described with reference to FIG. 1. However, the invention is not bound by the specific architecture; equivalent and/or modified functionality can be consolidated or divided in another manner and can be implemented in any appropriate combination of software, firmware and hardware. Those versed in the art will readily appreciate that the invention is, likewise, applicable to any computer system and any storage architecture implementing a virtualized storage system. In different embodiments of the invention the functional blocks and/or parts thereof may be placed in a single or in multiple geographical locations (including duplication for high-availability); operative connections between the blocks and/or within the blocks may be implemented directly (e.g. via a bus) or indirectly, including remote connection. The remote connection may be provided via Wire-line, Wireless, cable, Internet, Intranet, power, satellite or other networks and/or using any appropriate communication standard, system and/or protocol and variants or evolution thereof (as, by way of unlimited example, Ethernet, iSCSI, Fiber Channel, etc.). By way of non-limiting example, the invention may be implemented in a SAS grid storage system disclosed in U.S. patent application Ser. No. 12/544,743 filed on Aug. 20, 2009, assigned to the assignee of the present application and incorporated herein by reference in its entirety.

For purpose of illustration only, the following description is made with respect to RAID 6 architecture. Those skilled in the art will readily appreciate that the teachings of the present invention are not bound by RAID 6 and are applicable in a similar manner to other RAID technology in a variety of implementations and form factors.

Figure 2:
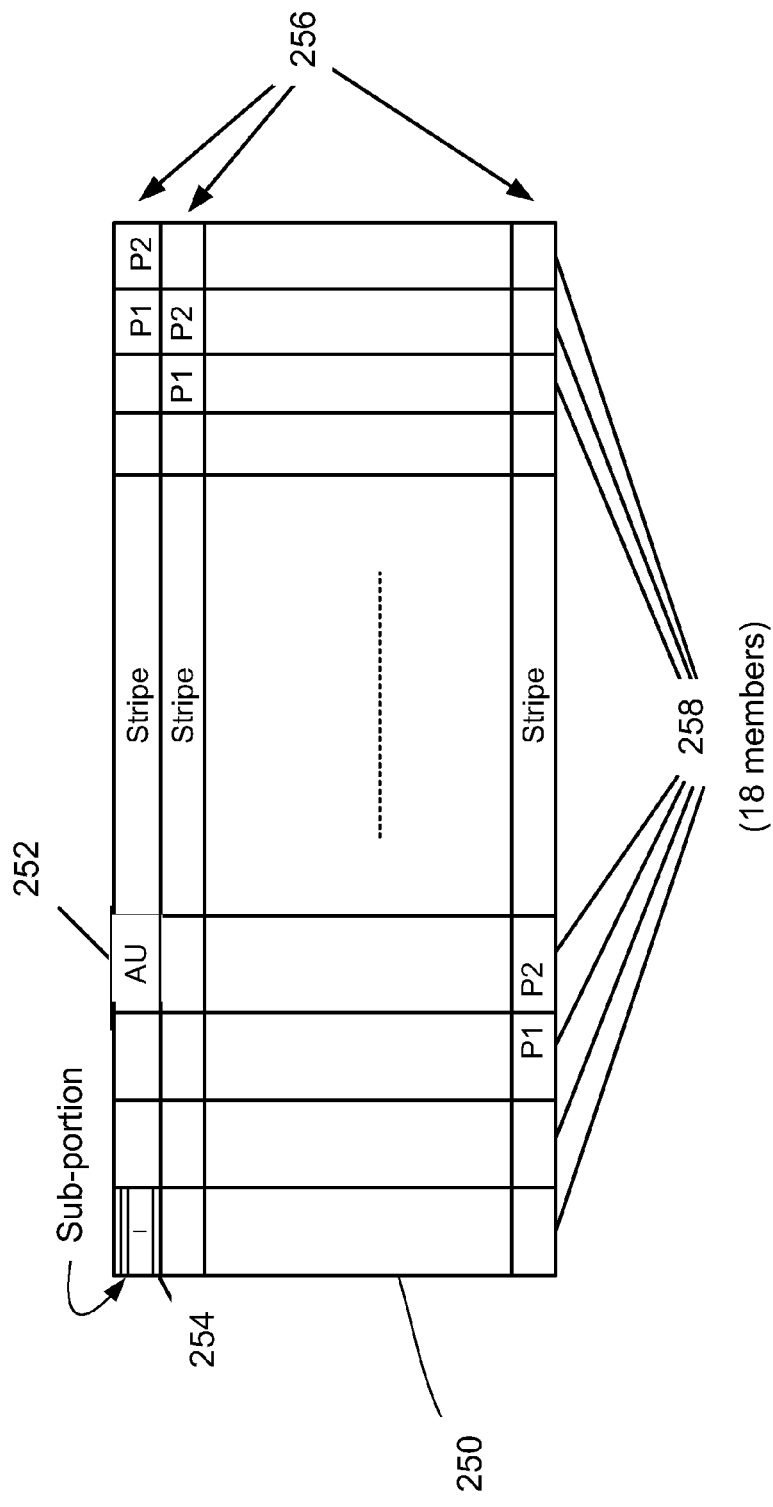
FIG. 2 illustrates a schematic diagram of storage space configured in RAID groups as known in the art.

Referring to FIG. 2, there is illustrated a schematic diagram of storage space configured in RAID groups as known in the art. A RAID group (250) can be built as a concatenation of stripes (256), the stripe being a complete (connected) set of data and parity elements that are dependently related by parity computation relations. In other words, the stripe is the unit within which the RAID write and recovery algorithms are performed in the system. A stripe comprises N+2 data portions (252), the data portions being the intersection of a stripe with a member (256) of the RAID group. A typical size of the data portions is 64 KByte (or 128 blocks). Each data portion is further sub-divided into 16 sub-portions (254) each of 4 Kbyte (or 8 blocks). Data portions and sub-portions (referred to hereinafter also as "allocation units") are used to calculate the two parity data portions associated with each stripe. In an example with N=16, and with a typical size of 4 GB for each group member, the RAID group can typically comprise (4*16=) 64 GB of data. A typical size of the RAID group, including the parity blocks, can be of (4*18=) 72 GB.

Each RG comprises N+2 members, MEMi ($0 \leq i \leq N+1$), with N being the number of data portions per RG (e.g. N=16). The storage system is configured to allocate (e.g. with the help of the allocation module 105) members of RAID groups over various physical disks.

Figure 3:
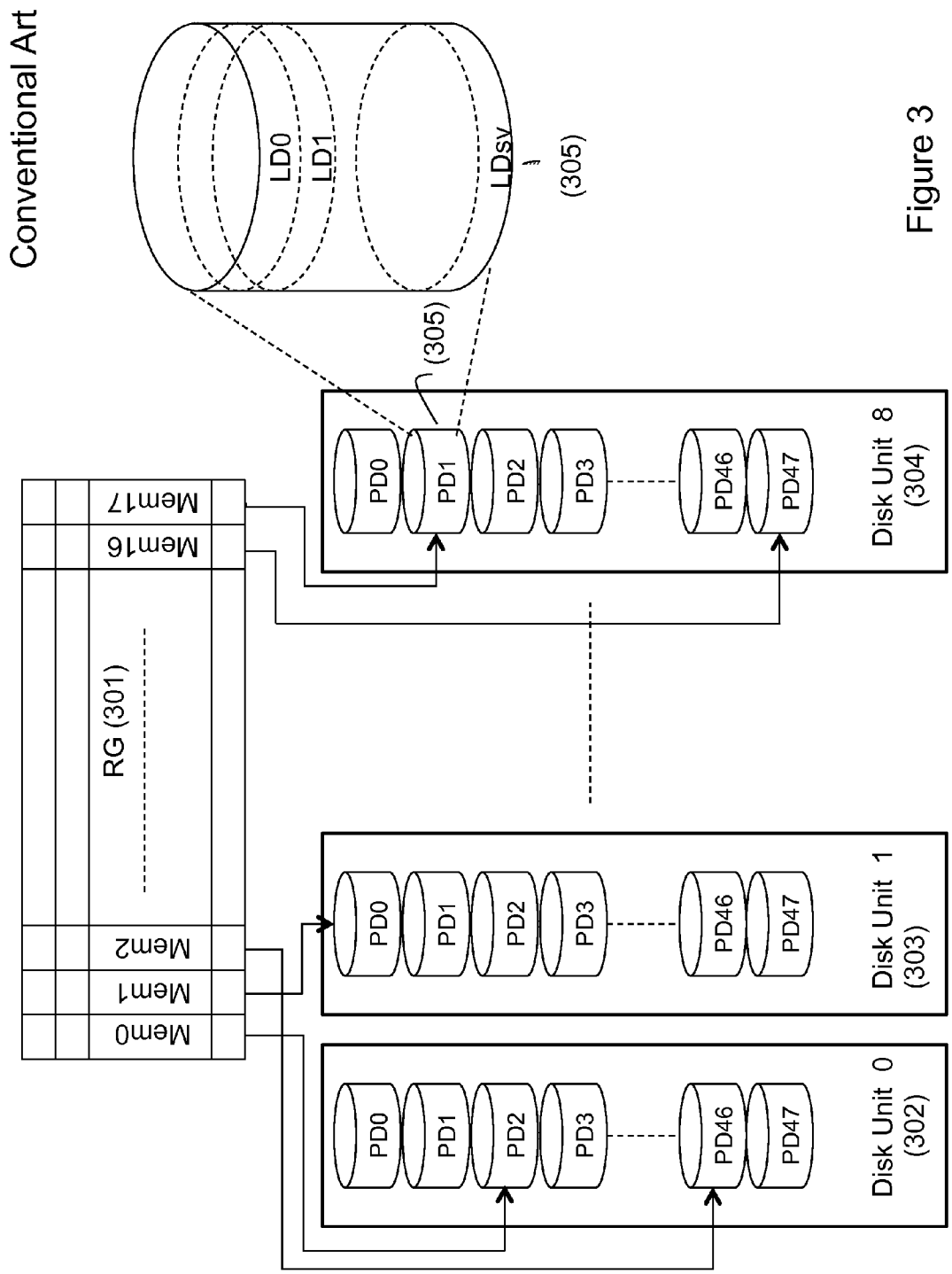
FIG. 3 illustrates a schematic diagram of physical storage constituted by physical disks as known in the art.

Referring to FIG. 3, there is illustrated a non-limiting example of physical storage space constituted by nine disk units (denoted as 302-304), each comprising 48 physical disks (PDs), ($PD_m, DU_n$) denoting physical disk $PD_m$ in Disk Unit n. Each physical disk is divided into consecutive, equal-sized partitions constituting logical disks LDs. As illustrated, physical disk 305 is divided into logical disks $LD_0$-$LD_{sv}$. The physical storage space can be configured as a concatenation of RAID Groups (RGs). Each RG comprises N+2 members, MEMi ($0 \leq i \leq N+1$), where N is the number of data portions per RG (e.g. N=16), ($MEM_i, RG_t$) denotes member i of RAID Group t. The storage system is configured to associate each member MEMi of a given RG with a physical disk and a respective logical disk, thus allocating storage location for each member of RGs. The size of logical disks is equal to the size of RG members. The association of RG members with logical disks is provided with the help of allocation module 105 configured to distribute the members of the RGs over the LDs in the storage system.

Figure 4B:
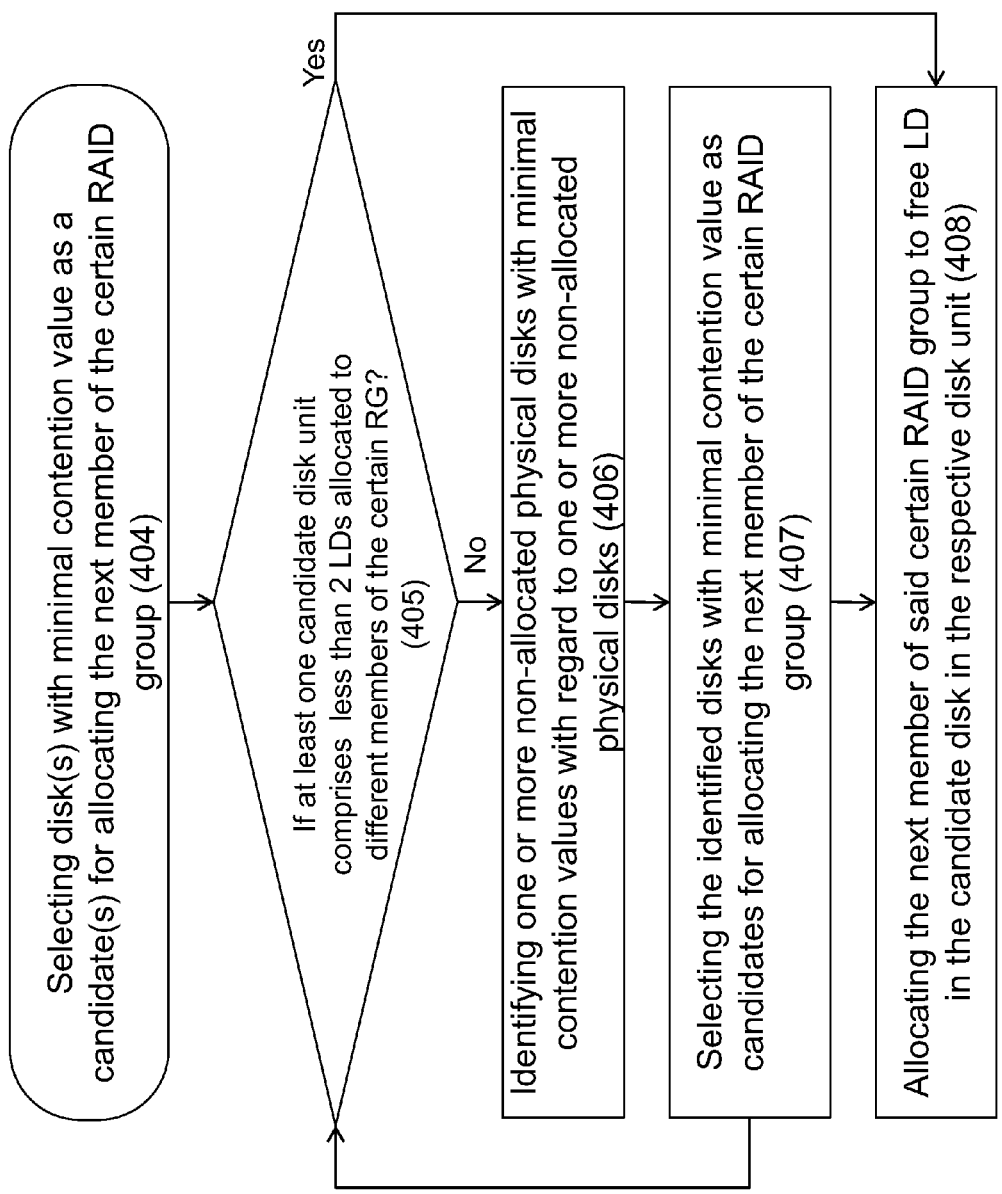

Referring to FIGS. 4a and 4b, there is illustrated a generalized flow-chart of allocating logical disks for RG members in accordance with certain embodiments of the presently disclosed subject matter.

By way of non-limiting examples, the method can be operative for allocating one or more new RAID groups and/or re-allocating existing RAID groups in a case of a disk and/or disk unit failure and/or re-allocating existing RAID groups in a case of a new disk and/or disk unit.

A free logical disk can be allocated for a first member $MEM_0$ of a certain RAID group in any appropriate way known in the art (e.g. randomly, in accordance with sequential number and/or occupancy of physical disks and/or disk units, etc.) In accordance with certain embodiments of the presently disclosed subject matter, the allocation module is configured to allocate a next member $MEM_{i+1}$ of a certain RAID group in accordance with allocation (401) of a previous member(s) of the same RAID group comprising N+2 members, where $0<i<N+1$. The allocation module identifies (402) one or more physical disks comprising at least one logical disk with an already allocated member of the certain RAID group, such physical disks referred to hereinafter as physical disks allocated with respect to the certain RAID group, or allocated physical disks.

Any pair of physical disks can be characterized by a number of RAID groups having members allocated to both disks in the pair, this number being referred to hereinafter as a contention value of the pair of physical disks.

The allocation module further identifies (403) one or more pairs constituted by an allocated physical disk and non-allocated physical disks, and identifies among these pairs one or more pairs having minimal contention value. The allocation module further selects (404) among the identified pairs with minimal contention value one or more non-allocated physical disks as candidates for allocating the next member $MEM_{i+1}$ of the certain RAID group.

Upon selecting (404) one or more candidates, the allocation module identifies (405) among the disk units corresponding to the selected candidates one or more disk units matching a reliability criterion. By way of non-limiting example, in case of RAID 6 protection scheme, a disk unit matching the reliability criterion shall comprise less than two logical disks allocated to different members of the certain RG; accordingly if there are already two members of the same RAID group allocated to the disk unit, such a disk unit does not match the reliability criterion. If there are more than one such identified disk units matching the reliability criterion, the allocation module can select, among the identified disk units, the disk unit for allocation of the next member $MEM_{i+1}$ of the certain RAID group, randomly, in accordance with maximal value of free (not associated to any member of any RG) logical disks, lowest sequence number of disk unit, and/or other criteria.

Upon selecting the disk unit for allocation, the allocation module allocates (408) the next member $MEM_{i+1}$ of the certain RAID group to a free logical disk in one of candidate physical disks corresponding to the selected disk unit. If there are more than one candidate physical disks corresponding to the selected disk unit, the physical disk for allocation can be finally selected among such candidates (e.g. randomly, in accordance with sequential number and/or occupancy of physical disks, etc.). Alternatively or additionally, the disk can be finally selected in accordance with performance and/or reliability characteristics of respective disks (e.g. derived from data related to the disks and accommodated in the storage system during a certain period of time).

In certain embodiments of the presently disclosed subject matter, the allocation module can be configured to identify for each allocated physical disk all pairs with non-allocated physical disks having minimal contention values. The allocation module can be further configured to select as candidates all non-allocated physical disks in all pairs with minimal contention value identified for all allocated physical disks. The allocation module can be further configured to identify all disk units matching the reliability criterion among disk units corresponding to all selected candidates, and further select, among all candidates corresponding to the identified disk units, the disk for allocation.

Alternatively, at least one of the operations in the group comprising identifying pairs having minimal contention values, selecting candidates, identifying disk units matching the reliability criterion and final selecting corresponding candidate disk for allocation can be provided until the first match (or other predefined number of matches and/or other predefined criteria). For example, the allocation module can identify a pair with minimal contention value (e.g. allocated physical disk and non-allocated physical disk having no common RAID groups) and check if the disk unit corresponding to the respective candidate non-allocated disk matches the reliability criterion. If not, the allocation module can identify any next pair with minimal contention value (or, alternatively, next pair selected in accordance with a certain criterion, e.g. with a certain allocated physical disk, with minimal contention value), and check if the disk unit corresponding to the non-allocated disk in such a next pair matches the reliability criterion. The allocation module can repeat the process until identifying the disk unit matching the reliability criteria or until completing the check for all disk units corresponding to all non-allocated physical disks in all pairs with all allocated disk units having minimal contention value.

In case that none of the disk units corresponding to non-allocated physical disks in all pairs with each of allocated physical disks and having minimal contention matches the reliability criterion, the allocation module further identifies (406) one or more pairs of non-allocated physical disks with minimal contention values, selects (407) one or more non-allocated disks from such pairs as candidates for allocating the next member of the certain RAID group, and repeats operations 405 and 408 for the newly selected candidates.

The operations 402-408 can be repeated for any next member of the certain RAID group until allocation of all members of the certain RAID group.

In accordance with certain embodiments of the currently presented subject matter, the storage system with RAID 6 protection scheme can be configured such that the number of members of a RAID group equals twice the number of disk units. Resulting from the operations 401-408, in such a storage system each RAID group will be provided with two allocated logical disks in every disk unit, or in other words, two members of each RG will be allocated to two LDs in each DU.

When RAID 6 groups are allocated in accordance with the presently disclosed allocation method, percentage of common data shared between two disks can be calculated as a number of members in the RAID group divided by a number of disks in the storage system. In the illustrated example, the common space between two disks is less than 4% (16 RG members/48*8 PDs). The reduced common space can have several advantages for enhancing fault tolerance of the storage system.

For example, although RAID 6 configuration protects the storage system from a second disk failure, the system is exposed to a third failure during the rebuilding process after the second failure. In accordance with certain embodiments of the currently disclosed subject matter, rebuilding after the second failure can be first provided to the members that are common to the failed disks (4% in the illustrated example). The process of rebuilding the rest of the members will be continued with no exposure for a third failure. If a third disk fails before completing rebuild of the common members, the data loss will be limited to 4% of total data.

If to assume in the illustrated example that the physical disks have 2 TB size, the common data to be rebuilt thereby eliminating exposure to a third failure are about 80 GB (4%). Accordingly, in the exemplified embodiment of the presently disclosed subject matter, the time of exposure to a third failure is about 7 min. (assuming speed of 200 Mb/sec).

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present invention.

It will also be understood that the system according to the invention may be, at least partly, a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

In accordance with certain embodiments of the present invention, RGs are substantially evenly distributed across all available disks and Disk Units (DUs— or enclosures) with the help of a pick-up function MC(MEMi,RGt) characterizing the distribution of the members of a Raid Group, RGt, over the LDs in the system base on a "minimal contention" principle.

Let the pair (PDm,DUn) denote physical disk PDm in Disk Unit n, and the pair (MEMi,RGt) denote member i of RAID Group t. The following parameters may be used in defining the function MC(MEMi,RGt) for an entire RG, the function being designed to pick the LD associated with MEMi successively, as i runs from 0 to n+1:

FLD(PDm,DUn)—this is the number of LDs which are currently free (i.e., not allocated to any member of an existing RG) in physical drive disk PDm, of Disk Unit DUn.

SELECTED(i)—as the procedure is running for a given RG, and it has distributed its members (MEMi,RGt) over PDs, for all indexes k (0<k≤i), SELECTED(i) comprises the list of all pairs (PDm,DUn) for which LDs have been already associated with pairs (MEMk,RGt).

PRESELECT(MEMi,RGt)—this is a list of pairs (PDm, DUn) that the procedure preselects in a preliminary stage and from which one pair may be then selected to assign a LD within it to (MEMi,RGt).

CONTENTION(PDn1,DUm1,PDn2,Dum2)—for any pair of pairs (PDn1,Dum1), (PDn2,Dum2) in the system, this variable indicates the number of instances of RGs, members of which have simultaneously been assigned to both.

MINCONTENTION(i)—as the procedure is running for a given RG, and it has distributed its members (MEMi,RGt) over PDs, for all indexes k (0<k≤i), this parameter may be established by calculating the values of CONTENTION (PDn1,Dum1,PDn2,DUm2) when (PDn1,Dum1) take successively all the values indicated by PRESELECTED(k), and (PDn2,Dum2) take, for each such k, all the possible values in the system. The return value of MINCONTENTION(i) is a list of one or more pairs (PDn,DUm) that yield the minimal value yield with this calculation.

DUSELECT(DUk)—this is the number of members of RGj that have already been assigned to DUk (in our example, 0≤k≤8) as part of the current run of procedure 100. One of the aims of the "minimal contention" procedure is that no more than two LDs be selected for members of the same RG within the same DU, in order to enhance workload balance in the system. Thus, if at some point procedure 100 has determined that a third LD within the same DU is to be assigned to a member of the same RG, then this choice is rejected and a further candidate is chosen. See below step 110-6.

Let us now assume that we want to assign LDs for the 18 members of a certain RG, say RGt. The "minimal contention" pick-up function MC(MEMi,RGj) may be defined for all values of i, 0≤i≤17, with the help of the procedure, schematically defined according to the following steps:

100-1. Set i=0. Set PRESELECT(MEMi,RGt) to comprise the list of all pairs (PDm,DUn) in the system.

100-2. From among all pairs listed in PRESELECT (MEMi,RGt) select the physical disk for which FLD(PDm, Dun) is minimal. If there be more than one such disk with same value of FLD(PDm,Dun), which is minimal, then select anyone of them, for example the one with lowest value of n and, if there be still more than one such, then select the one for which m is minimal.

100-3. Let (PDpi,DUqi) denote for the current value of i, the physical disk thus selected, and let (LDF,PDpi,DUqi) denote the first LD in (PDpi,DUqi) which is currently free.

100-4. For (MEMi,RGt), we choose the value of MC(MEMi,RGt) to be MC(MEMi,RGt)=(LDF,PDpi,DUqi) as selected in step 100-3.

100-5. Set i=i+1. If i=n+2 (in our example, i=18), the procedure stops. All members of the RG have thus been assigned to LDs. Otherwise continue to the next step.

100-6. Calculate MINCONTENTION(i). From among the list of pairs (PDn,DUm) thus obtained, delete those for which DUSELECT(DUk)=2. Let MINCONTENTION(i) be the list obtained after deletion of such pairs.

100-7. If step MINCONTENTION(i) is an empty list, then recalculate MINCONTENTION(i), this time for all pairs in the system, except for those obtained in a first calculation and then deleted. Continue with this procedure until a list of one or more pairs is obtained.

100-8. Set PRESELECT(MEMi,RGt) to be the list of pairs obtained in step 100-7. Continue with the procedure in step 100-2.

It should be noticed that the aim of step 100-2 is to produce an initial choice of LDs form within PRESELECT(MEMi, RGt). Those versed in the art will readily appreciate that the pre-selection may be done, likewise, in other ways, some of them known in the art.

It should also be noticed that the procedure assumes the number of members of an RG equals twice the number of DUs. This situation produces a good symmetry in which two LDs in every DU will end up being associated with members of each RG. This is, however, not a necessary condition, and the procedure will work equally well also in case that the number of members is less than twice the number of DUs. The procedure will stop in step 100-5, once all members have been distributed. Still, in case the number of members of an RG equals twice the number of DUs, then, when i=n+1, only one DU will be left in step 100-5 for which DUSELECT(DUk) is not 2, and the procedure will choose it anyway.

The invention claimed is:

1. For use with a storage system comprising a plurality of physical disks constituting a physical storage space, and a plurality of disk units, each comprising several of the plurality of physical disks, said physical storage space is configured as a concatenation of a plurality of RAID (Redundant Array of Independent Disks) groups, each RAID group comprising N+2 members; wherein the RAID groups are configured as RAID 6 groups and the number of members of a RAID group equals twice the number of disk units; a method of allocating a physical disk to a group member of a given RAID group, the method comprising:

characterizing each pair of physical disks of the plurality of physical disks by a contention value being a number of RAID groups with members allocated to both physical disks in the pair;

identifying among multiple pairs of physical disks one or more pairs having a minimal contention value, the minimal contention value being a contention value that is a minimum of contention values of all pairs;

allocating said group member to a certain physical disk selected from physical disks comprised in said one or more pairs; wherein the allocating is performed such that every disk unit comprises no more than two allocated group members of said given RAID group.

2. The method of claim 1 further comprising identifying a disk unit matching a reliability criterion; wherein the certain physical disk that is used for allocating the group member is comprised in the disk unit.

3. The method of claim 1 wherein there are identified more than one disk units matching the reliability criterion, the method further comprising selecting, among the identified disk units, the disk unit for allocation of the group member of said given RAID group.

4. The method of claim 2 comprising identifying one or more candidate physical disks from the physical disks comprised in said one or more pairs, selecting, among the one or more candidate physical disks, the certain physical disk for allocation of the group member of said given RAID group, wherein the selection is provided in accordance with at least one criterion characterizing the physical disks and selected from the group comprising: occupancy of the physical disks; the lowest sequence number; the highest performance characteristics; performance characteristics within a certain range; the highest reliability characteristics; reliability characteristics matching a certain range.

5. The method of claim 2 wherein at least one of the operations:
identifying one or more pairs and identifying a disk unit matching the reliability criterion, is provided until a predefined number of matches are made.

6. The method of claim 1 further comprising selecting among the one or more pairs with minimal contention value all non-allocated physical disks as candidates for allocation to said group member.

7. The method of claim 1 wherein the percentage of common data shared between two physical disks is characterized by a number of members in a RAID group divided by a number of physical disks in the storage system.

8. The method of claim 1 operative for at least one process selected from the group comprising:
allocating one or more new RAID groups;
re-allocating existing RAID groups in case of a disk and/or disk unit failure; and
re-allocating existing RAID groups in case of a new disk and/or disk unit.

9. The method of claim 1 wherein the storage system is configured in accordance with the RAID 6 protection scheme, and wherein rebuilding after two concurrent failures is first provided to the members of RAID groups that are common to respective failed disks.

10. A computer program comprising computer program code means for performing all the steps of claim 1 when said program is run on a computer.

11. A computer program as claimed in claim 10 embodied on a computer readable medium.

12. For use with a storage system comprising a plurality of physical disks constituting a physical storage space, and a plurality of disk units, each comprising several of the plurality of physical disks, said physical storage space is configured as a concatenation of a plurality of RAID (Redundant Array of Independent Disks) groups, each RAID group comprising N+2 members; a method of allocating a physical disk to a group member of a given RAID group, the method comprising:

characterizing each pair of physical disks of the plurality of physical disks by a contention value being a number of RAID groups with members allocated to both physical disks in the pair;

identifying among multiple pairs of physical disks one or more pairs having a minimal contention value, the minimal contention value being a contention value that is a minimum of contention values of all pairs;

identifying one or more candidate physical disks among the physical disks comprised in said one or more pairs,;

identifying among disk units comprising the one or more candidate physical disks at least one disk unit matching a reliability criterion; and identifying at least one candidate physical disk corresponding to the at least one disk unit;

selecting, from the at least one candidate physical disk, a certain physical disk for allocation of the group member of said given RAID group, wherein the selection is provided in accordance with at least one criterion characterizing the physical disks and selected from the group consisting of: occupancy of the physical disks; the lowest sequence number; the highest performance characteristics; performance characteristics within a certain range; the highest reliability characteristics; and reliability characteristics matching a certain range:, and allocating said group member of said given RAID group to the certain physical disk.

13. A storage system comprising a plurality of physical disks constituting a physical storage space, and an allocation module operatively connected to a plurality of disk units, each disk unit comprising several of the plurality of physical disks, each physical disk configured to comprise a plurality of logical disks, said physical storage space is configured as a concatenation of a plurality of RAID 6 (Redundant Array of Independent Disks) groups, each RAID group comprising N+2 members; wherein the number of members of a RAID group equals twice the number of disk units in the storage system, wherein every disk unit comprises logical disks allocated to members of each RAID group, and wherein there are two logical disks in each disk unit allocated to a certain RAID group, the allocation module further operable:

to characterize each pair of physical disks of the plurality of physical disks by a contention value being a number of RAID groups with members allocated to both physical disks in the pair;

to identify one or more pairs having a minimal contention value, the minimal contention value being a contention value that is a minimum of contention values of all pairs; and to allocate said group member of said given RAID group to a certain physical disk among physical disks comprised in said one or more pairs.

14. The storage system of claim 13 further comprising a plurality of disk units, each comprising several of the plurality of physical disks, wherein the allocation module is operable to identify a disk unit matching a reliability criterion; wherein the certain physical disk selected for allocating the group member is comprised in the disk unit.

15. The storage system of claim 14 wherein the RAID groups are configured as RAID 6 groups, and wherein the allocation module is configured to allocate said group member to said certain physical disk in accordance with a reliability criterion that requires that a matching disk unit comprises no more than two members of said given RAID group.

16. The storage system of claim 14 further operable to provide at least one of the operations: identifying one or more pairs, and identifying disk units matching the reliability criterion until a predefined number of matches are made.

17. A storage system comprising a plurality of physical disks constituting a physical storage space, a plurality of disk units, each comprising several of the plurality of physical disks, and an allocation module, said physical storage space is configured as a concatenation of a plurality of RAID (Redundant Array of Independent Disks) groups, each RAID group comprising N+2 members; the allocation module further operable:

to characterize each pair of physical disks of the plurality of physical disks by a contention value being a number of RAID groups with members allocated to both physical disks in the pair;

to identify one or more s airs having a minimal contention value the minimal contention value being a contention value that is a minimum of contention values of all pairs;

to identify among the disk units at least one disk unit matching a reliability criterion; to identify a certain physical disk among the physical disks comprised in said one or more pairs and further comprised in the at least one disk unit; and to allocate said group member of said given RAID group to the certain physical disk.

18. The storage system of claim 13 wherein the percentage of common data shared between two physical disks is characterized by a number of members in a RAID group divided by a number of physical disks in the storage system.

19. The storage system of claim 18 operable, in case of rebuilding after two concurrent failures, first to rebuild the members of RAID groups that are common to respective failed disks.

\* \* \* \* \*